United States Patent [19]

Cuscurida et al.

[11] 4,267,120
[45] May 12, 1981

[54] POLYESTER POLYCARBONATES

[75] Inventors: Michael Cuscurida; George P. Speranza, both of Austin, Tex.

[73] Assignee: Texaco Development Corp., White Plains, N.Y.

[21] Appl. No.: 103,757

[22] Filed: Dec. 14, 1979

[51] Int. Cl.³ .................. C07C 69/96; C08G 63/62
[52] U.S. Cl. .................................... 260/463; 521/125; 521/172; 521/174; 521/902; 528/80; 528/83; 528/272; 528/297; 528/301
[58] Field of Search ............... 260/463; 528/297, 272, 528/301, 80

[56] References Cited

U.S. PATENT DOCUMENTS

| | | | |
|---|---|---|---|
| 3,030,331 | 4/1962 | Goldberg | 528/301 |
| 3,449,467 | 6/1969 | Wynstra | 528/272 |
| 4,041,018 | 8/1977 | Binsack et al. | 528/272 |
| 4,072,704 | 2/1978 | Langdon | 260/463 |

*Primary Examiner*—Donald G. Daus
*Assistant Examiner*—M. C. Eakin

*Attorney, Agent, or Firm*—Carl G. Ries; Robert A. Kulason; James L. Bailey

[57] ABSTRACT

Covers polyester polycarbonates of the structure:

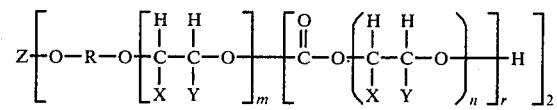

wherein X and Y, independently, are H, methyl, or ethyl, m and n independently are integers of 1–5, R is a nucleus of a glycol selected from the group of lower alkylene glycols and polyalkylene glycols of up to about 600 molecular weight, Z is an organic radical from a cyclic organic acid anhydride having 4–20 carbon atoms, and r is an integer of 1–5.

Also covers a method of preparing said polyester polycarbonates as well as polyurethanes derived therefrom, as well as polyisocyanurate polymers containing both isocyanurate linkages and urethane linkages.

4 Claims, No Drawings

POLYESTER POLYCARBONATES

BACKGROUND OF THE INVENTION

1. Field of the Invention

This invention relates to polyester polycarbonates, their preparation and use in making polymer foams including both polyurethane polymers and polyisocyanurate polymers.

2. Description of the Prior Art

Polyurethane polymers and polyisocyanurate polymers such as those in rigid and flexible foam form are well known in the art. The latter type of polymers are made by utilizing a polyisocyanurate group formation catalyst to promote formation of both isocyanurate linkages and urethane linkages to produce urethane-modified polyisocyanurate polymers.

Both polyesters and polycarbonates have been used in the preparation of polyurethane polymers such as those in foam form. Materials of this type are used to prepare both polyurethane and polyisocyanurate flexible and rigid foams as well as semi-flexible and semi-rigid foam types. See, for example, U.S. Pat. Nos. 2,915,550; 3,133,113; 3,248,415; 3,248,414; 3,248,416; 3,764,457; and 3,699,679.

However, many prior art foams prepared from polyol sources of these types are deficient in a number of sought-after properties. For example, many polyisocyanurate rigid foams so prepared do not have a sufficiently low friability to be commercially useful. In other instances the foams do not have the proper degree of burn resistance. In yet other instances the foam formulations are not sufficiently viscous. Thus, when such urethane systems are applied in spray form the relatively low viscosity products tend to sag when applied.

It therefore would be a distinct improvement in the art to prepare novel polyester polycarbonates useful in making polyurethane and polyisocyanurate foams which do not possess the above-discussed drawbacks and others. Other objects will appear hereinafter.

SUMMARY OF THE INVENTION

This invention comprises novel polyester polycarbonates falling with the following structural formula:

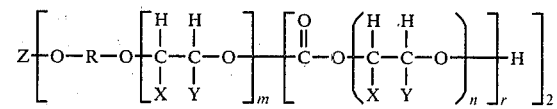

The invention is also concerned with the method of preparing said polyester polycarbonates which comprises contacting (a) a cyclic organic acid anhydride having from 4 to about 20 carbon atoms;

(b) a 1,2-epoxide selected from the group of epichlorohydrin and alkylene oxides having from 2 to 4 carbon atoms;

(c) carbon dioxide; and (d) a polyhydric compound of the formula

HO—R—OH wherein R is a divalent alkylene or polyoxyalkylene radical having from 2 to about 6 carbon atoms in a reaction zone in the presence of a basic catalyst at a temperature of from about 100° C. to about 200° C. and at a pressure of from about 50 psig to about 2,000 psig, wherein the mole ratio of polyhydric compound to acid anhydride is from about 1:1 to about 5:1, the mole ratio of 1,2-epoxide to carbon dioxide is from about 4:1 to about 1:1, and the polyhydric compound is present in an amount such that the ratio of the number of moles of 1,2-epoxide plus carbon dioxide to the number of moles of polyhydric compound is from about 5 to about 25, and recovering the polyester polycarbonate from the reaction mixture.

The compounds are useful as a polyol source in preparing polyisocyanurate, polyurethane and polyurethane-polyisocyanurate polymeric resins and foams.

DESCRIPTION OF THE PREFERRED EMBODIMENTS

According to the method of this invention, novel polyester polycarbonates are obtained by the reaction of a cyclic organic acid anhydride, a 1,2-epoxide, carbon dioxide and a polyhydric compound in the presence of a basic catalyst. The resulting polyester polycarbonates are terminated with hydroxyl groups, have a molecular weight in the range of from about 220 to about 2000 and have a hydroxyl number of from about 50 to about 400.

The high molecular weight polyester polycarbonates of this invention, comprised of a multiplicity of carbonate and glycol residues terminated by hydroxyl groups and initiated by an organic cyclic anhydride may be represented by the structure:

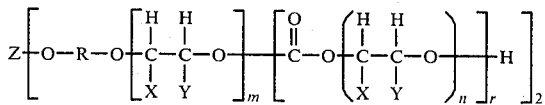

wherein X and Y, independently, are H, methyl, or ethyl, m and n independently are integers of 1–5, R is a nucleus of a glycol selected from the group consisting of lower alkylene glycols and polyalkylene glycols of up to about 600 molecular weight, Z is an organic radical from a cyclic organic acid anhydride having 4–20 carbon atoms, and r is an integer of 1–5.

These polyester polycarbonates vary in color from light to dark brown and are generally viscous liquids. The incorporation of the organic acid anhydride, particularly an aromatic acid anhydride, into the structure gives the polyester polycarbonates of this invention a special utility for use in preparing polyurethane foams of improved friability and burn resistance. The high viscosity of the polyester polycarbonates makes them especially useful in polyurethane spray formulations in imparting a resistance to sagging. Halogen may be introduced into the polyester polycarbonate through use of a halogen containing cyclic organic anhydride.

The polyester polycarbonates of this invention can be prepared by various methods. In one embodiment, the organic acid anhydride, glycol, 1,2-epoxide and carbon dioxide are simultaneously contacted in the presence of a basic catalyst at an elevated temperature. In an alternate embodiment, the organic acid anhydride, glycol and a cyclic carbonate are simultaneously contacted in the presence of a basic catalyst at elevated temperature. In this embodiment, the cyclic carbonate will, in the reaction environment, form the 1,2-epoxide and carbon dioxide. By this method, carbon dioxide will generally be recovered from the reaction mixture, in that it will be produced in an amount in excess of that which will be reacted to form the polyester polycarbonate.

In still another embodiment of this invention, the organic acid anhydride is initially reacted with the glycol to form a mixture comprising the half ester and/or the diester of the acid anhydride. The proportion of half ester to diester present in the reaction mixture will depend upon the ratio of reactants and the conditions under which the esterification is carried out. The glycol to anhydride ratio is at least 1:1 and is generally in the range of from about 1:1 to about 5:1. After the organic acid anhydride is converted to the half ester or diester, or mixture thereof, the reaction product is converted to the polyester polycarbonate by contacting it with the 1,2-epoxide and carbon dioxide or with a cyclic carbonate as previously described.

The organic acid anhydrides which are useful in the practice of this invention are cyclic acid anhydrides having from 4 to about 20 carbon atoms, including the cycloaliphatic acid anhydrides, such as maleic anhydride, succinic anhydride, tetrahydrophthalic anhydride, hexahydrophthalic anhydride; the halogenated cycloaliphatic acid anhydrides, such as dichlorosuccinic anhydride, hexabromophthalic anhydride, chlorendic anhydride and the like; aromatic acid anhydrides such as phthalic anhydride, trimellitic anhydride, pyromellitic dianhydride and the like; and halogenated aromatic anhydrides, such as tetrabromophthalic anhydride and the like. Preferred in the practice of this invention are the aromatic acid anhydrides and, if the polyester polycarbonate is to be employed in the preparation of polyurethane foams in which a high burn resistance is desired, the halogenated aromatic acid anhydrides are particularly preferred.

The polyhydric initiators which are useful in the practice of this invention are those having a molecular weight of from about 62 to about 600 and which are represented by the formula:

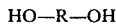

HO—R—OH wherein R is a divalent alkylene radical of from 2 to 6 carbon atoms or a divalent polyoxyalkylene glycol of up to 600 molecular weight. Illustrative of suitable polyhydric initiators are ethylene glycol, propylene glycol, butylene glycol, diethylene glycol, dipropylene glycol, polyalkylene glycols up to 600 molecular weight and the like.

The 1,2-epoxides which are useful in the practice of this invention are the alkylene oxides of from 2 to 4 carbon atoms, such as ethylene oxide, propylene oxide, or mixtures thereof and the like, and substituted alkylene oxide such as epichlorohydrin.

In embodiments of this invention, wherein the 1,2-epoxides and carbon dioxides are generated in situ by employing a cyclic carbonate, suitable cyclic carbonates are those represented by the formula:

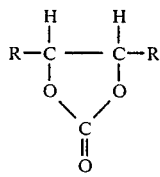

wherein R, independently, is hydrogen, lower alkyl or substituted lower alkyl. Illustrative cyclic carbonates are ethylene carbonate, propylene carbonate and the like. A preferred cyclic carbonate is ethylene carbonate.

In preparing the polyester polycarbonates according to this invention, the polyhydric initiator (glycol) and acid anhydride are employed in a mole ratio of from about 1:1 to about 10:1 and preferably from about 1:1 to about 5:1. The glycol functions, in part, to react with the acid anhydride to form the corresponding half ester or diester. The glycol also functions to control the molecular weight of the resulting polyester polycarbonate as will be hereinafter described.

The 1,2-epoxides and carbon dioxides are employed in a mole ratio of from about 2:1 to about 4:1 being preferred. Whenever a cyclic carbonate is employed in the process of this invention, the 1,2-epoxide radical and carbon dioxide will be produced in situ in a mole ratio of 1:1, however, carbon dioxide will be evolved from the reaction mixture as not all of it will be consumed in the formation of the polyester polycarbonates as herein described.

The 1,2-epoxides and carbon dioxide are employed in the foregoing ratio and in an amount such that the mole ratio of 1,2-epoxide and carbon dioxide to the glycol initiator is from about 5 to about 25, and preferably from about 10 to about 20. In this manner, the molecular weight of the resulting polyester polycarbonates can be controlled within the desired range.

The catalyst which is useful in the practice of this invention includes those basic catalysts known to catalyze the production of polycarbonates and include inorganic bases such as alkali carbonates among which are potassium carbonate, sodium carbonate, magnesium carbonate, and the like; alkali hydroxides, such as calcium hydroxide, and the like; alkaline bicarbonates such as sodium bicarbonate; and alkali stannates, such as sodium stannate and potassium stannate. Particularly preferred is potassium stannate.

The process of this invention is carried out at a temperature of from about 100° C. to about 200° C. in a liquid phase reaction at elevated pressure. A reaction pressure of from about 50 psig to about 2,000 psig is satisfactory, although greater pressures may be employed if desired. The reaction may be carried out batchwise or in a continuous manner, as for example, by passing the reactants through a tubular reaction zone under the aforementioned conditions.

The polyester polycarbonates formed by the process of this invention can be recovered from the reaction mixture by conventional techniques including neutralization of the reaction mixture, recovery of the product by vacuum distillation and filtration of the crude product. The unreacted reactants recovered from the reaction mixture may be recycled for reuse according to the process of this invention.

The polyester polycarbonates prepared according to this invention are light to dark brown, viscous liquids which are particularly useful in the preparation of rigid polyurethane foams of improved properties.

The following examples illustrate the invention.

EXAMPLE 1

Into a one-liter stirred autoclave were charged 53 g. diethylene glycol (0.5 mole), 37 g. phthalic anhydride (0.25 mole), 176 g. ethylene oxide (4.0 moles), 88 g. solid carbon dioxide (2.0 moles), and 1.75 g. potassium stannate (0.0059 mole). The reactor was then closed and the reactants heated 5.8 hours at 150°–154° C. Maximum pressure developed during the reaction was 850 psig.

The equilibrium pressure was 35 psig. The product (301 g.) was neutralized by stirring with 7.0 g. of an aqueous dispersion of a synthetic magnesium silicate (Brite Sorb 90). The neutralized product was then dewatered by vacuum stripping to 110° C. and 2 mm. and filtered with the aid of Celatom FW-60. The finished product was a light brown viscous liquid which had the following properties:

Acid no, mg KOH/g—0.21
Hydroxyl no., mg KOH/g—237
Water, wt.%—0.07
Viscosity, 25° C., cps—560
pH in 10:6 isopropanol-water—8.7
Potassium, pm—31.8
Tin, ppm—15
Molecular weight (Mn)—391

The NMR aromatic band of the above polyester polycarbonate was consistent with that of an ortho diester

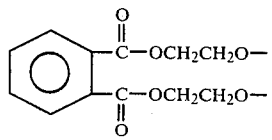

Other bands in the spectra were indicative of an ester structure and a series of linked ethoxy groups

The relative size of the ester bond also indicated that not all of the ester groups were due to the aromatic ester. The spectra also showed the presence of some ethylene carbonate. There was no indication of unreacted phthalic anhydride.

EXAMPLE 2

Into a three-gallon stirred autoclave were charged 530 g. diethylene glycol (5.0 moles), 740 g. phthalic anhydride (5.0 moles) and 10.0 g. potassium stannate. The reactor was then purged with prepurified nitrogen. Ethylene dioxide (1,760 g., 40.0 moles) was then charged to the reactor. Carbon dioxide (880 g., 20.0 moles) was then added to the reactor directly from a cylinder. The reactants were then heated 5.9 hours at 135°-155° C. The maximum pressure developed during the reaction was 1,175 psig while the equilibrium pressure at the end of the reaction was 110 psig. The product (8.25 lbs.) as recovered from the autoclave was a dark brown viscous liquid. It was neutralized by stirring with 11.9 g. 85% phosphoric acid. The neutralized product was stripped to a minimum pressure at 125° C., nitrogen stripped for one-half hour, and filtered with the aid of Hyflo Supercel. It had the following properties:

Acid no., mg KOH/g—0.76
Hydroxyl no., mg KOH/g—179
Water, wt.%—0.09
Viscosity, 25° C., cps—5100
Potassium, ppm—16.6
Tin, ppm—12
Ph in 10:6 isopropanol-water—3.7

EXAMPLE 3

Diethylene glycol (530 g., 5.0 moles), tetrabromophthalic anhydride (463 g., 1.0 mole), and potassium stannate (13.5 g., 0.047 mole) were charged to a three-gallon stirred autoclave. The reactor was then purged with prepurified nitrogen. Ethylene oxide (3,520 g., 80 moles) and carbon dixoide (880 g., 20 moles) were then charged to the reactor. The reactants were then heated 5.6 hours at 148°-155° C. Maximum pressure developed during the reaction was 850 psig while the equilibrium pressure was 122 psig. Crude product (11.49 lbs.) was neutralized at 95° C. by stirring with 54 g. of an aqueous dispersion of a synthetic magnesium silicate (Brite Sorb 90). The neutralized product was stripped to a minimum pressure at 130° C., nitrogen stripped, and filtered with the aid of Hyflo Supercel. The finished product was a brown viscous liquid which had the following properties:

Acid no., mg KOH/g—0.16
Hydroxyl no., mg KOH/g—144
Water, wt.%—0.12
Viscosity, 25° C., cps—810
Tin, ppm—13
Potassium, ppm—167

EXAMPLE 4

Into a three-gallon stirred autoclave were charged 227.4 g. ethylene glycol (3.67 moles), 544.2 g. chlorendic anhydride (1.47 moles), and 10.0 g. potassium stannate (0.0334 mole). The reactor was then purged with prepurified nitrogen. Ethylene oxide (2,583 g., 58.7 moles) and carbon dioxide (645.7 g., 14.7 moles) were then charged to the autoclave. The reactants were then heated 6.5 hours at 140°-150° C. Maximum pressure developed during the reaction was 900 psig. The equilibrium pressure was 100 psig. The recovered product (8.23 lbs.) was neutralized with 7.4 g. 85% phosphoric acid. The neutralized product was then vacuum stripped to a minimum pressure at 125° C., nitrogen stripped one-half hour, and filtered with the aid of Hyflo Supercel. The finished product was a black viscous liquid which had the following properties:

Acid no., mg KOH/g—0.38
Hydroxyl no., mg KOH/g—162
Water, wt.%—0.11
Viscosity, 25° C., cps—4200
pH in 10:6 isopropanol-water—7.4
Tin, ppm—26
Potassium, ppm—107

EXAMPLE 5

Into a one-liter stirred autoclave were charged 106 g. diethylene glycol (1.0 mole), 98 g. maleic anhydride (1.0 mole), 352 g. ethylene oxide (8.0 moles), 176 g. carbon dioxide (4.0 moles), and 1.8 g. potassium stannate (0.006 mole). The reactor was then closed and the reactants heated for 6.6 hours at 142°-154° C. The maximum reaction pressure was 618 psig and the equilibrium pressure was 35 psig. The resultant product was a black highly viscous liquid. It was neutralized with 1.0 g. 85% phosphoric acid and stripped at 110° C. at 2 mm. The stripped product had the following properties:

Acid no., mg KOH/g—0.12
Hydroxyl no., mg KOH/g—392
Water, wt.%—0.06
Viscosity, 25° C., cps—18,000

EXAMPLE 6

Into a ten-gallon kettle equipped with an agitator, water condenser, and back pressure regulator were charged 183.9 g. ethylene glycol (2.96 moles), 440.4 g. phthalic anhydride (2.96 moles), 3,913 g. ethylene carbonate (44.47 moles), and 9.1 g. potassium stannate (0.0308 mole). The reactor was then thoroughly purged with prepurified nitrogen. The reactants were then heated to 185° C. Carbon dioxide gas started coming off slowly at 150° C. and at a good rate at 185° C. A maximum pressure of 100 psig was maintained in the kettle by adjusting the back pressure regulator. The reaction was continued at 185°-195° C. at 100 psig for 9–10 hours at which time carbon dioxide evolution had essentially ceased. The product was then cooled to 95° C. and neutralized by stirring with an aqueous dispersion of synthetic magnesium silicate (Brite Sorb 90). After neutralization, the product was stripped to a minimum pressure at 125° C., nitrogen stripped, and filtered. The finished product had the following properties:

Acid no., mg KOH/g—0.09
Hydroxyl no., mg KOH/g—197
Water, wt.%—0.02
Viscosity, 25° C., cps—2300
Tin, ppm—15
Potassium, ppm—32

EXAMPLE 7

The 179 hydroxyl number polyester polycarbonate of Example 2 was employed in the preparation of a hand-mixed isocyanurate rigid foam. The foam exhibited excellent properties, particularly high heat distortion temperature, low friability, and burn resistance in the absence of added fire retardant. Formulation, details of preparation, and foam properties are shown in the following Table 1:

TABLE 1

| | |
|---|---|
| Foam Formulation, pbw | |
| Polyester polycarbonate[1] | 27.4 |
| DC-193 silicone | 0.5 |
| Fluorocarbon R-11b | 12.0 |
| Potassium octoate[2] | 1.5 |
| THANATE ® P-270[3] | 58.7 |
| Isocyanate index | 5.0 |
| Details Of Preparation | |
| Mix time, sec. | 4 |
| Cream time, sec. | 7–8 |
| Rise time, sec. | 70 |
| Tack-free time, sec. | 85 |
| Properties | |
| Density, pcf | 1.92 |
| Heat distortion temp., °C. | 197 |
| Compressive strength, psi | |
| $\overline{w}$ rise | 33.7 |
| $\overline{x}$ rise | 10.3 |
| Closed cells, % | 94.3 |
| Friability, % wt. loss | 6.5 |
| Butler Chimney Test | |
| Weight retained, % | 90.9 |
| Seconds to extinguish | 11.6 |
| Flame ht., in. | 8.7 |

[1] The polyester polycarbonate of Example 2, hydroxyl number 179.
[2] 50% solution in 700 molecular weight propylene oxide adduct of glycerin.
[3] A polyphenylene polymethylene polyisocyanate having an average functionality of 2.7; Jefferson Chemical Co.

EXAMPLE 8

The 144 hydroxyl number polyester polycarbonate of Example 3 was employed in the preparation of hand-mixed isocyanurate rigid foam. In addition to the overall good properties, the foams exhibited improved burn resistance, particularly with the incorporation of a fire retardant (Fyrol CEF) into the formulation. Formulations, details of preparation, and foam properties are shown in the following Table 2:

TABLE 2

| | A | B |
|---|---|---|
| Foam Formulation, pbw | | |
| Polyester polycarbonate[1] | 31.9 | 29.7 |
| DC-193 silicone | 0.5 | 0.5 |
| Fluorocarbon R-11b | 12.0 | 12.0 |
| Fyrol CEF[2] | — | 6.0 |
| Potassium octoate[3] | 1.0 | 1.0 |
| THANATE ® P-270[4] | 54.6 | 50.8 |
| Isocyanate index | 5.0 | 5.0 |
| Details of Preparation | | |
| Mix time, sec. | 4 | — |
| Cream time, sec. | 6 | — |
| Rise time, sec. | 60 | — |
| Tack-free time, sec. | 28 | — |
| Properties | | |
| Density, pcf. | 2.26 | 2.27 |
| Heat distortion temp., °C. | 152 | 180 |
| Compressive strength, psi | | |
| $\overline{w}$ rise | 32.7 | 23.0 |
| Closed cells, % | 93.3 | 90.6 |
| Friability, % wt. loss | 12.8 | 22.8 |
| Butler Chimney Test | | |
| Weight retained, % | 86.6 | 97.2 |
| Seconds to extinguish | 11 | 10 |
| Flame ht., in. | 11 | 3.2 |

[1] The polyester polycarbonate of Example 3, hydroxyl no. 144
[2] Tris(chloroethyl) phosphate; Stauffer Chemical Co.
[3] 50% solution in 700 molecular weight propylene oxide adduct of glycerin
[4] A polyphenylene polymethylene polyisocyanate having an average functionality of 2.7; Jefferson Chemical Co.

EXAMPLE 9

The 162 hydroxyl number polyester polycarbonate of Example 4 was employed in the preparation of hand-mixed isocyanurate rigid foams. In addition to the generally good properties, the foams exhibited improved burn resistance, particularly with the incorporation of a fire retardant (Fyrol CEF) into the formulation. Formulations, details of preparation, and foam properties are shown in the following Table 3:

TABLE 3

| | A | B |
|---|---|---|
| Foam Formulation, pbw | | |
| Polyester polycarbonate[1] | 29.5 | 27.7 |
| DC-193 silicone | 0.5 | 0.5 |
| Fluorocarbon R-11b | 12.0 | 12.0 |
| Fyrol CEF[2] | — | 6.0 |
| Potassium octoate[3] | 2.0 | 2.0 |
| THANATE ® P-270[4] | 56.3 | 52.3 |
| Isocyanate index | 5.0 | 5.0 |
| Details of Preparation | | |
| Mix time, sec. | 3 | 3 |
| Cream time, sec. | 6 | 6 |
| Rise time, sec. | 50 | 30 |
| Tack-free time, sec. | 70 | 55 |
| Properties | | |
| Density, pcf. | 2.3 | 2.4 |
| Heat distortion temp., °C. | 195 | 174 |
| Compressive strength, psi | | |
| $\overline{w}$ rise | 36.1 | 36.7 |
| Closed cells, % | 93.9 | 91.6 |
| Friability, % wt. loss | 22.0 | 26.4 |
| Butler Chimney Test | | |
| Weight retained, % | 81 | 93 |
| Seconds to extinguish | 10 | 10 |

TABLE 3-continued

|  | A | B |
|---|---|---|
| Flame ht., in. | 11 | 7 |

[1] The polyester polycarbonate of Example 4, hydroxyl no. 162
[2] Tris(chloroethyl) phosphate; Stauffer Chemical Co.
[3] 50% solution in 700 molecular weight propylene oxide adduct of glycerin
[4] A polyphenylene polymethylene polyisocyanate having an average functionality of 2.7; Jefferson Chemical Co.

EXAMPLE 10

The 197 hydroxyl number polyester polycarbonate of Example 6 was employed in the preparation of hand-mixed isocyanurate rigid foams. In addition to the good properties, the foams exhibited improved burn resistance, particularly with the incorporation of a fire retardant (Fyrol CEF) into the formulation. Formulations, details of preparation, and foam properties are shown in the following Table 4:

TABLE 4

|  | A | B |
|---|---|---|
| Foam Formulation, pbw | | |
| Polyester polycarbonate[1] | 25.1 | 23.8 |
| DC-193 silicone | 0.5 | 0.5 |
| Fluorocarbon R-11b | 12.0 | 12.0 |
| Fyrol CEF[2] | — | 6.0 |
| Potassium octoate[3] | 1.75 | 1.75 |
| THANATE® P-270[4] | 60.1 | 55.9 |
| Isocyanate index | 5.0 | 5.0 |
| Details of Preparation | | |
| Mix time, sec. | 3 | 3 |
| Cream time, sec. | 5 | 5 |
| Rise time, sec. | 50 | 27 |
| Tack-free time, sec. | 70 | 50 |
| Properties | | |
| Density, pcf | 2.39 | 2.42 |
| Heat distortion temp., °C. | 172 | 156 |
| Compressive strength, psi | | |
| $\overline{w}$ rise | 36.7 | 37.3 |
| Closed cells, % | 93.7 | 92.2 |
| Friability, % wt. loss | 13.5 | 20.3 |
| Butler Chimney Test | | |
| Weight retained, % | 80.7 | 94 |
| Seconds to extinguish | 10 | 10.5 |
| Flame ht., in. | 11 | 6.5 |

[1] The polyester polycarbonate of Example 6, hydroxyl no. 197
[2] Tris(chloroethyl) phosphate; Stauffer Chemical Co.
[3] 50% solution in 700 molecular weight propylene oxide adduct of glycerin
[4] A polyphenylene polymethylene polyisocyanate having an average functionality of 2.7; Jefferson Chemical Co.

EXAMPLE 11

According to the procedure of Example 6, a 180 hydroxyl number polyester polycarbonate was prepared by reaction of diethylene glycol (4.62 moles), tetrabromophthalic anhydride (0.92 mole), and ethylene carbonate (41.2 moles). The product was then employed in the preparation of hand-mixed isocyanurate rigid foam. In addition to the good properties, the foam exhibited improved burn resistance, particularly with the incorporation of a fire retardant (Fyrol CEF) into the formulation. Formulations, details of preparation, and foam properties are shown in the following Table 5:

TABLE 5

|  | A | B |
|---|---|---|
| Foam Formulation, pbw | | |
| Polyester polycarbonate | 27.4 | 25.4 |
| DC-193 silicone | 0.5 | 0.5 |
| Fluorocarbon R-11b | 12.0 | 12.0 |
| Fyrol CEF[1] | — | 6.0 |
| Potassium octoate[2] | 1.75 | 1.75 |
| THANATE® P-270[3] | 58.5 | 54.4 |
| Isocyanate index | 5.0 | 5.0 |
| Details of Preparation | | |
| Mix time, sec. | 3 | 3 |
| Cream time, sec. | 5 | 5 |
| Rise time, sec. | 30 | 25 |
| Tack-free time, sec. | 50 | 45 |
| Properties | | |
| Density, pcf | 2.21 | 2.31 |
| Heat distortion temp., °C. | 206 | 193 |
| Compressive strength, psi | | |
| $\overline{w}$ rise | 31.5 | 30.1 |
| Closed cells, % | 93.3 | 94.6 |
| Friability, % wt. loss | 27 | 29.3 |
| Butler Chimney Test | | |
| Weight retained, % | 90.7 | 94.6 |
| Seconds to extinguish | 10.5 | 10.2 |
| Flame ht., in | 8.5 | 5.2 |

[1] Tris(chloroethyl) phosphate; Stauffer Chemical Co.
[2] 50% solution in 700 molecular weight propylene oxide adduct of glycerin.
[3] A polyphenylene polymethylene polyisocyanate having an average functionality of 2.7; Jefferson Chemical Co.

We claim:

1. A polyester polycarbonate of the structure

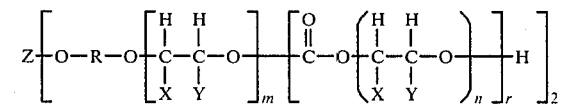

wherein X and Y, independently, are H, methyl, or ethyl, m and n independently are integers of 1–5, R is a nucleus of a glycol selected from the group of lower alkylene glycols which have 2–6 carbon atoms and polyalkylene glycols of up to about 600 molecular weight, Z is an organic radical from a cyclic aliphatic or aromatic organic acid anhydride having 4–20 carbon atoms, and r is an integer of 1–5.

2. The polyester polycarbonate of claim 1, wherein Z is an organic radical from a cyclic organic aromatic anhydride having from 4 to about 20 carbon atoms.

3. The polyester polycarbonate of claim 2, wherein Z is the nucleus of phthalic anhydride.

4. The polyester polycarbonate of claim 2, wherein Z is the nucleus of maleic anhydride.

* * * * *